United States Patent
Nakazawa (10) Patent No.: US 6,812,966 B1
(45) Date of Patent: Nov. 2, 2004

(54) EXPOSURE APPARATUS HAVING IMAGE DISPLAY FUNCTIONS, AND ELECTRONIC CAMERA, DATA TERMINAL, AND PORTABLE COMMUNICATION APPARATUS HAVING EXPOSURE FUNCTION

(75) Inventor: Toru Nakazawa, Kitasouma-gun (JP)

(73) Assignee: Polaroid Corporation, Waltham, MA (US)

( * ) Notice: Subject to any disclaimer, the term of this patent is extended or adjusted under 35 U.S.C. 154(b) by 816 days.

(21) Appl. No.: 09/806,662
(22) PCT Filed: Aug. 1, 2000
(86) PCT No.: PCT/JP00/05083
§ 371 (c)(1),
(2), (4) Date: Mar. 30, 2001
(87) PCT Pub. No.: WO01/10114
PCT Pub. Date: Feb. 8, 2001

(30) Foreign Application Priority Data
Aug. 2, 1999 (JP) .......................................... 11/219018

(51) Int. Cl.[7] ........................ H04M 5/222; H04M 5/225
(52) U.S. Cl. ................................ 348/333.01; 348/207.2
(58) Field of Search ........................ 348/333.01, 333.06, 348/333.09, 333.11, 341, 373, 211.2, 207.2, 207.99; 358/906, 909.1; 396/30, 429, 315, 310

(56) References Cited

U.S. PATENT DOCUMENTS

| 5,128,773 A | 7/1992 | Sato |
| 5,721,993 A | 2/1998 | Ito et al. |
| 5,796,466 A | 8/1998 | Choi |
| 5,822,637 A | 10/1998 | Stephenson |
| 6,397,006 B1 * | 5/2002 | Sasaki et al. .......... 348/333.06 |
| 6,628,333 B1 * | 9/2003 | Gowda et al. ........... 348/207.2 |

FOREIGN PATENT DOCUMENTS

| EP | 0 827 328 A2 | 3/1998 |
| JP | 10-104752 | 4/1998 |

OTHER PUBLICATIONS

PCT International Search Report, PCT/JP 00/05083.
WIPO Publication, WO 98 18253 A.

* cited by examiner

Primary Examiner—Aung Moe

(57) ABSTRACT

An apparatus has LCD 13, a photosensitive material holding device that holds photosensitive material 21 on the back of the LCD, first shutter device 20 that can let through and block light from the LCD to the photosensitive material, and second shutter device 19 that blocks infiltration of external light by covering the display surface of the LCD during exposure. In addition, guiding device 18 that conducts the display light of the LCD to the photosensitive material and exposure light source 17 for the LCD also may be installed. Furthermore, apparatuses are disclosed that have a display window in which the LCD can be placed and a device that shields the display window, and support the LCD within a housing such that it rotates freely between a display position in which its display surface faces the display window and an exposure position in which its display surface faces the photosensitive material. The invention enables print output of display data on a liquid crystal display without damaging the portability of various types of portable electronic devices such as electronic cameras, data terminals, or portable telephones.

12 Claims, 6 Drawing Sheets

| | DISPLAY-SIDE SHUTTER | FILM-SIDE SHUTTER | COLD CATHODE TUBE | EXPOSURE LIGHT SOURCE |
|---|---|---|---|---|
| DURING DISPLAY | OPEN | CLOSED | LIT | EXTINGUISHED |
| DURING EXPOSURE | CLOSED | OPEN | EXTINGUISHED | LIT |

| | DISPLAY-SIDE SHUTTER | FILM-SIDE SHUTTER | COLD CATHODE TUBE |
|---|---|---|---|
| DURING DISPLAY | OPEN | CLOSED | LIT |
| DURING EXPOSURE | CLOSED | OPEN | LIT |

EXPOSURE APPARATUS HAVING IMAGE DISPLAY FUNCTIONS, AND ELECTRONIC CAMERA, DATA TERMINAL, AND PORTABLE COMMUNICATION APPARATUS HAVING EXPOSURE FUNCTION

TECHNICAL FIELD

This invention pertains to an exposure apparatus, electronic camera, data terminal, and portable communication apparatus (such as a portable telephone or PDA (Personal Digital Assistant). More particularly, this invention pertains to technology that exposes an image displayed on a liquid crystal display onto photosensitive material such as instant film.

BACKGROUND ART

In recent years, various types of electronic cameras (digital cameras) have been offered that convert object images formed by an optical lens to electrical signals and record these on a recording medium as image data. Compared to current silver salt cameras that record object images on photosensitive film, this type of electronic camera has advantages such as captured image data can be used as is on a computer, or images can be processed easily by various types of data processing.

In addition, electronic notebooks that manage individual data such as schedules or addresses and various types of portable data terminals (such as so-called mobile terminals) that can exchange data with personal computers are offered, and even this type of data terminal frequently will be able to handle image data as memory capacity is expanded or CPU speed is increased.

Although these portable electronic devices can be viewed even outdoors or in outdoor venues by displaying various data on a display, generally, it is not possible to output data on the displayed screen to a printer on the spot.

For example, in the case of an electronic camera, a recorded image can be confirmed by a liquid crystal viewfinder, but to obtain a printed image (photograph or print image) requires an operation in which image data are taken up by a personal computer and outputted to a printer to print, and a photograph (print image) cannot be obtained on the spot where it was photographed.

In addition, dedicated printers (photoprinters or sublimation printers) are offered that can output prints by taking up data directly by the external memory medium of the camera without passing through a personal computer. However, because these printers use a great amount of electricity and are structurally difficult to miniaturize, at present, no printer is yet offered that can be made portable.

If product size is ignored, it is certainly considered technically feasible to add a printing function even to existing electronic cameras or data terminals. However, as can be seen in the severe recent competition to miniaturize digital video cameras and competition to make notebook personal computers thinner, it cannot be denied that especially for these electronic cameras that have portability as a premise, the weight, size, and thickness of the product are major factors governing demand for this product.

DISCLOSURE OF INVENTION

Therefore, the purpose of this invention is to enable print output of display data without losing portability in various types of portable electronic devices such as electronic cameras or data terminals that can display various data on a display.

To achieve the purpose given above and solve the problems described above, the exposure apparatus with which a first aspect of this invention is concerned is an exposure apparatus that can copy display data on a liquid crystal display means onto photosensitive material, and it has a photosensitive material holding means that holds photosensitive material on the back of a liquid crystal display means, a first shutter means that can let through and block light from the above-mentioned liquid crystal display means to the above-mentioned photosensitive material, and a second shutter means that blocks infiltration of external light by covering the display surface of the above-mentioned liquid crystal display means during exposure of the above-mentioned photosensitive material.

The electronic camera with which a second aspect of this invention is concerned is an electronic camera that has a photographing means that converts an object image formed by a photographic lens to image data and a liquid crystal display means that can display the object image based on said image data, and can copy the above-mentioned object image onto photosensitive material, and it has a photosensitive material holding means that holds photosensitive material on the back of a liquid crystal display means, a first shutter means that can let through and block light from the above-mentioned liquid crystal display means to the above-mentioned photosensitive material, and a second shutter means that blocks infiltration of external light by covering the display surface of the above-mentioned liquid crystal display means during exposure of the above-mentioned photosensitive material.

The data terminal with which a third aspect of this invention is concerned is a data terminal that can copy display data on a liquid crystal display means onto photosensitive material, and it has a photosensitive material holding means that holds photosensitive material on the back of a liquid crystal display means, a first shutter means that can let through and block light from the above-mentioned liquid crystal display means to the above-mentioned photosensitive material, and a second shutter means that blocks infiltration of external light by covering the display surface of the above-mentioned liquid crystal display means during exposure of the above-mentioned photosensitive material.

The portable communication apparatus with which a fourth aspect of this invention is concerned is a portable communication apparatus that has a liquid crystal display means and a communication means that can receive at least data that can be displayed on said liquid crystal display means, and it has a photosensitive material holding means that holds photosensitive material on the back of a liquid crystal display means, a first shutter means that can let through and block light from the above-mentioned liquid crystal display means to the above-mentioned photosensitive material, and a second shutter means that blocks infiltration of external light by covering the display surface of the above-mentioned liquid crystal display means during exposure of the above-mentioned photosensitive material.

In a fifth aspect of this invention, such a portable communication apparatus further has a photographing means that can convert an object image formed by a photographic lens to image data, the above-mentioned communication means can transmit the above-mentioned image data, and the above-mentioned liquid crystal display means can display an image based on the above-mentioned image data.

The exposure apparatus with which a sixth aspect of this invention is concerned furthermore is an exposure apparatus that can copy display data on a liquid crystal display means onto photosensitive material, it has a display window in which the above-mentioned liquid crystal display means can be placed, a photosensitive material holding means that holds photosensitive material within the housing of said apparatus, and a display window shielding means that can block infiltration of external light by shielding the above-mentioned display window, and the above-mentioned liquid crystal display means is supported within the above-mentioned housing such that it rotates freely between a display position in which its display surface faces the above-mentioned display window and an exposure position in which its display surface faces the above-mentioned photosensitive material.

The electronic camera with which a seventh aspect of this invention is concerned also is an electronic camera that has a photographing means that converts an object image formed by a photographic lens to image data and a liquid crystal display means that can display the object image based on said image data, and can copy the above-mentioned object image onto photosensitive material, it has a display window in which the above-mentioned liquid crystal display means can be placed, a photosensitive material holding means that holds photosensitive material within the housing of said apparatus, and a display window shielding means that can block infiltration of external light by shielding the above-mentioned display window, and the above-mentioned liquid crystal display means is supported within the above-mentioned housing such that it rotates freely between a display position in which its display surface faces the above-mentioned display window and an exposure position in which its display surface faces the above-mentioned photosensitive material.

The data terminal with which an eighth aspect of this invention is concerned also is a data terminal that can copy display data on a liquid crystal display means onto photosensitive material, it has a display window in which the above-mentioned liquid crystal display means can be placed, a photosensitive material holding means that holds photosensitive material within the housing of said apparatus, and a display window shielding means that can block infiltration of external light by shielding the above-mentioned display window, and the above-mentioned liquid crystal display means is supported within the above-mentioned housing such that it rotates freely between a display position in which its display surface faces the above-mentioned display window and an exposure position in which its display surface faces the above-mentioned photosensitive material.

The portable communication apparatus with which a ninth aspect of this invention is concerned also is a portable communication apparatus that has a liquid crystal display means and a communication means that can receive at least data that can be displayed on said liquid crystal display means, it has a display window in which the above-mentioned liquid crystal display means can be placed, a photosensitive material holding means that holds photosensitive material within the housing of said apparatus, and a display window shielding means that can block infiltration of external light by shielding the above-mentioned display window, and the above-mentioned liquid crystal display means is supported within the above-mentioned housing such that it rotates freely between a display position in which its display surface faces the above-mentioned display window and an exposure position in which its display surface faces the above-mentioned photosensitive material.

In addition, in a tenth aspect of this invention, the above-mentioned display window shielding means sometimes opens the display window as the above-mentioned liquid crystal display means is rotated to the above-mentioned display position, and closes the display window as the above-mentioned liquid crystal display means is rotated to the above-mentioned exposure position. In addition, in an eleventh aspect of this invention, each of the above-mentioned apparatuses may further have a guiding means that conducts the display light of the above-mentioned liquid crystal display means to the above-mentioned photosensitive material. Furthermore, in a twelfth aspect of this invention, each of the above-mentioned apparatuses may have a light source for supplying light for exposure to the above-mentioned liquid crystal display means, and the above-mentioned photosensitive material is exposed by the light supplied from said light source.

By using a liquid crystal display (liquid crystal display means) that can display various data such as images, text, or graphics, this invention can copy said display data onto photosensitive material.

The first aspect of the invention pertains to an exposure apparatus. An image or the like is displayed on a liquid crystal display means based on data taken up from various types of electronic devices such as an electronic camera, personal computer, portable telephone, data terminal apparatus, or PDA (Personal Digital Assistant), and this is exposed onto photosensitive material. The photosensitive material is held on the back side (the opposite side from the display surface) of the liquid crystal display means by installing the above-mentioned photosensitive material holding means, and the display light of the liquid crystal display means is irradiated onto said photosensitive material.

Moreover, preferably, as in the eleventh aspect of the invention, a guiding means that conducts the display light of the liquid crystal display means to the photosensitive material (such as an optical fiber array in which many optical fibers are adhered in a two-dimensional flat array) is installed between the liquid crystal display means and the photosensitive material, and exposure is performed through said guiding means. This is to block scattering of display light from the liquid crystal display means and obtain a sharper exposed image. However, because exposure onto photosensitive material can be performed, for example, by putting the liquid crystal display means and photosensitive material in close vicinity, this guiding means is not an essential component in this invention (the first to tenth aspects).

As the photosensitive material, preferably, an instant film is used that can obtain an image on the spot where it is photographed. This is to obtain photographic images instantly even outdoors or in outdoor venues. However, because display data displayed on a liquid crystal display also can by copied by standard photographic film (such as 35 mm negative film) that requires separate developing processing, this invention does not exclude standard photographic film other than instant film. In addition, because image size can be modified as appropriate, for example, by changing the screen size of the liquid crystal display means, film size is not limited to any particular size. Similarly, there is no limitation on whether the photosensitive material is color or black and white. Furthermore, the above-mentioned photosensitive material holding means preferably has an appropriate film feeding mechanism to enable printing (exposing) several copies.

Such photosensitive material is exposed by shielding from light by the above-mentioned first shutter means and allowing light to pass from the liquid crystal display means to the photosensitive material by said shutter means during exposure. The shutter drive time (open time) can be the set exposure time applied to said photosensitive material, but is not necessarily limited to this. For example, the shutter can be left open for a longer time than said set exposure time, and the drive time (display time) of the liquid crystal display means (in the twelfth aspect of the invention, the exposure light source) can be made to correspond to said set exposure time. This is because optimum exposure onto photosensitive material also can be realized by control such as drive control of the liquid crystal display means (display light source) or on/off control of the liquid crystal display.

In addition, display data on a display can be exposed satisfactorily onto photosensitive material by covering the display surface of the liquid crystal display means by the above-mentioned second shutter means installed separately from the first shutter means and blocking infiltration of external light during exposure onto such photosensitive material.

There are no special limitations on the first and second shutter means so long as they can let through and block light. For example, these may be focal plane shutters or other mechanical shutters used in silver salt cameras by prior art, and there is no objection to shutters such as liquid crystal shutters that can shield or expose photosensitive material by changing their physical properties (light permeability).

In addition, in this invention, preferably, a light source for supplying light for exposure to the liquid crystal display means is installed as in the twelfth aspect of the invention, and the above-mentioned photosensitive material is exposed by the light supplied from said light source. This is because although photosensitive material can be exposed by the display light of the liquid crystal display, adequate exposure lighting can be assured and exposure performed in a shorter time by installing a light source such as a strobe (flash) light or white light emitting diode separately from said light.

Moreover, any existing permeable (such as TFT color liquid crystal panels or DSTN liquid crystal panels) or reflective type liquid crystal displays can be used as the liquid crystal display means. In addition, it does not matter if the exposure method onto photosensitive material, besides exposing by one exposure operation per one photosensitive material, is, for example, a method that exposes successively (three times) by color filters installed in the liquid crystal display for each color (R (red), G (green), and B (blue), or Y (yellow), M (magenta), and C (cyan).

The second aspect of the invention pertains to an electronic camera. Said camera has a liquid crystal display means (liquid crystal display) as a means that displays photographic images. A photosensitive material holding means and a first shutter means are installed on the back of the liquid crystal display in the same way as in the above-mentioned exposure apparatus, and an image displayed on the liquid crystal display can be copied onto photosensitive material in the same way as the above-mentioned exposure apparatus.

The third aspect of the invention pertains to a data terminal. Here, "data terminal" is an apparatus that has a liquid crystal display means (liquid crystal display) and can display various types of data such as images, text, or graphics on this. More concretely, this includes, for example, electronic notebooks and various types of mobile terminal devices. It does not matter if this also has a photographing means (such as an optical lens and photographic device and so on) and has image photographing function such as the above-mentioned electronic camera.

The fourth aspect of the invention pertains to a portable communication apparatus. Said "portable communication apparatus" refers to a communication device that has a communication means that includes at least a receiving function, and a display device. More concretely, this includes, for example, portable telephones (Personal Handy-Phone System (PHS), Handy Telephone), e-mail phones, PDA (Personal Digital Assistants), high-functional type portable telephones (portable telephones with PDA), communication devices that have data transmitting and receiving functions such as mobile terminals that have a communication function, and so-called pocket Bells (pager) that can only receive data (do not have a transmitting function). Furthermore, the fifth aspect of the invention houses an electronic camera (photographing) function in these communication devices.

In such as portable communication apparatus, photosensitive material is held on the back of a liquid crystal display means by a photosensitive material holding means in the same way as in the above-mentioned exposure apparatus, and data displayed on the LCD (liquid crystal display means) can be copied onto photosensitive material by irradiating and exposing the display light of the liquid crystal display means onto said photosensitive material.

The sixth to ninth aspects of the invention pertain to an exposure apparatus, electronic camera, data terminal, and portable communication apparatus that are different from each of the above-mentioned the first to fourth aspects of the invention.

These apparatuses have a liquid crystal display means and a display window for the user to view said liquid crystal display means, and photosensitive material is held within the apparatus housing by a photosensitive material holding means. The liquid crystal display means is supported within the apparatus housing such that it rotates freely, is placed in the above-mentioned display window, and can move (rotate) between a display position in which its display surface faces said display window and an exposure position in which its display surface faces the photosensitive material.

Exposure onto photosensitive material is performed using the display light (such as the backlight) of the liquid crystal display means, for example, by displaying the data to be exposed on the liquid crystal display means for a set time. In addition, a separate light source for exposure such as a strobe light or white light emitting diode may be installed, and exposure can be performed in a shorter time using this type of structure. Furthermore, the same structure as in the apparatuses of the above-mentioned the first to fourth aspects can be used, in which a first shutter means is installed between the liquid crystal display means in exposure position and the photosensitive material and exposure time is controlled by this.

During exposure, the display window is closed by the above-mentioned display window shielding means, and infiltration of external light is blocked. This is to assure satisfactory exposure onto photosensitive material. Moreover, such a display window shielding means opens the display window at the display position where the liquid crystal display means is placed in the display window, making it possible for the user to view the data displayed on the liquid crystal display means through the display window.

According to the invention described above, this invention enables print output of display data on a liquid crystal display without damaging the portability of various types of portable electronic devices.

BRIEF DESCRIPTION OF DRAWINGS

Below, working examples of this invention are explained based on the appended figures. In the drawings, similar reference characters denote similar elements throughout the several views.

BEST MODE FOR CARRING OUT THE INVENTION

Figure 1:
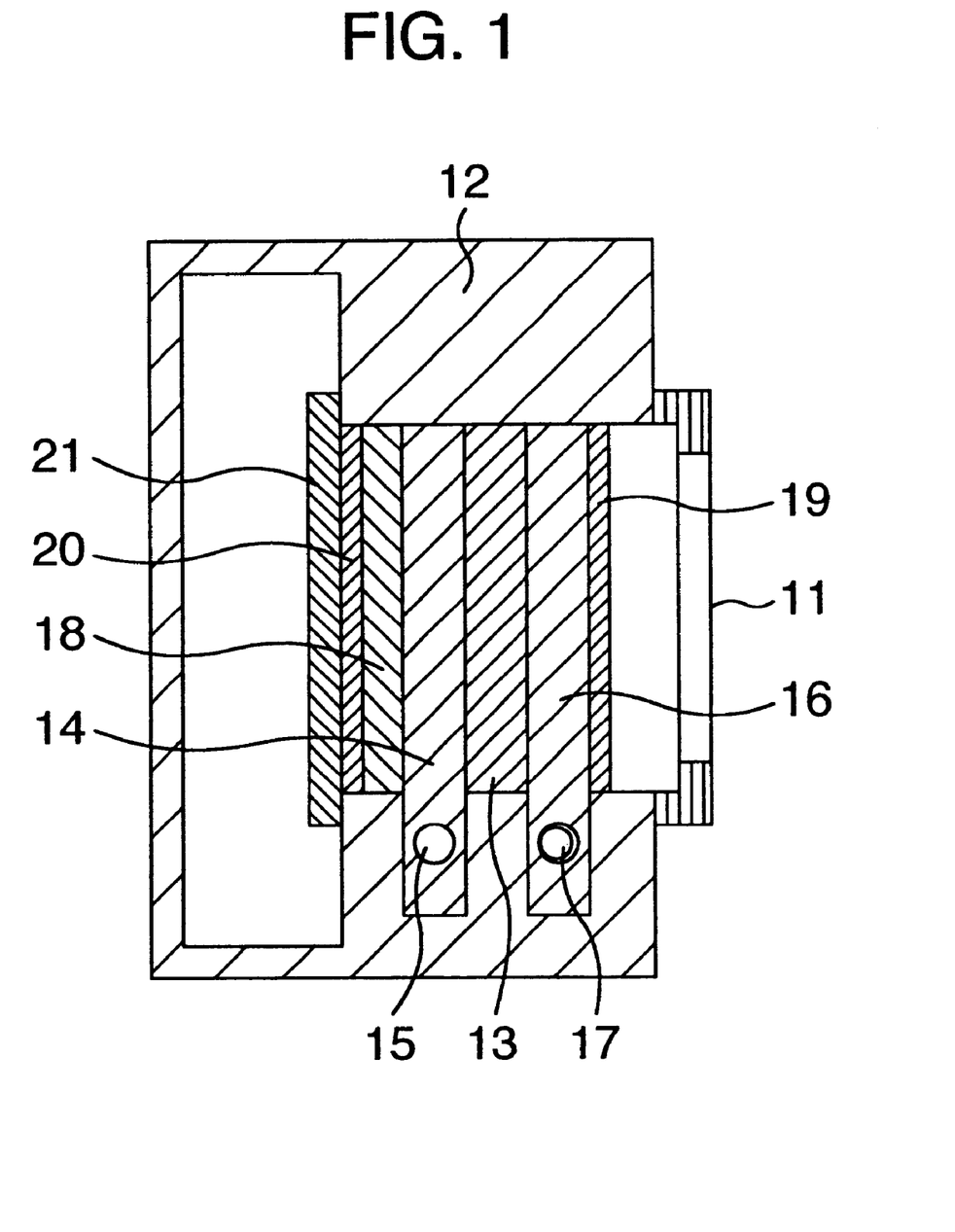
FIG. 1 is a schematic diagram that shows the viewfinder part of an electronic camera with which this invention is concerned.
Figure 2:
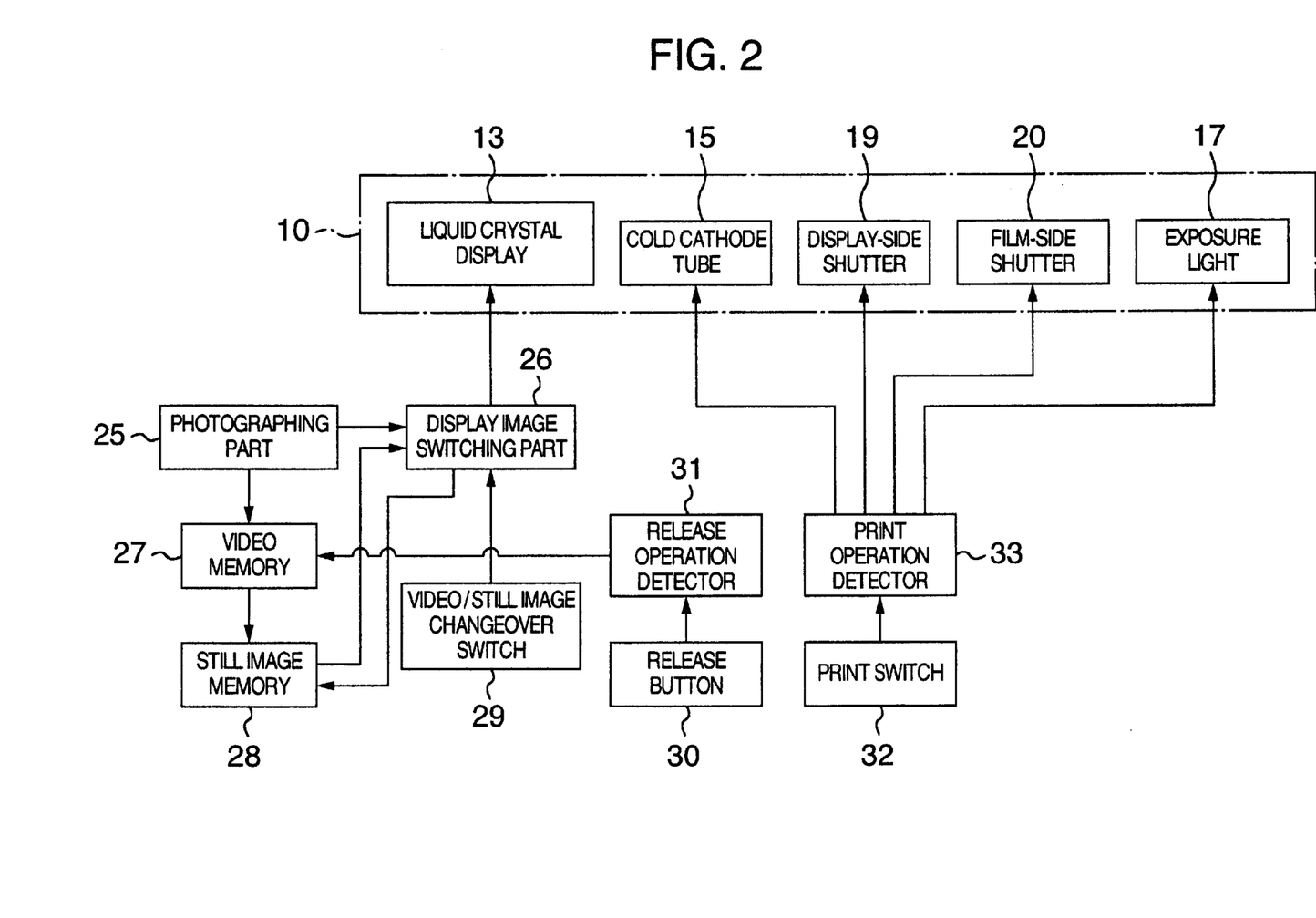
FIG. 2 is a block diagram of the electronic camera of FIG. 1.

FIG. 1 is a schematic diagram that shows the viewfinder part of an electronic camera with which one working example is concerned, and FIG. 2 is a block diagram that shows the essential parts of said camera.

As shown in the figures, this electronic camera has photographing part 25 that converts an object image to image data, and viewfinder part 10 that includes liquid crystal display (LCD) 13. Photographing part 25 includes an appropriate optical lens, photoelectric sensing element (such as a CCD), and image processing circuit (each not shown) similar to existing electronic cameras. Image data from said photographing part 25 are transmitted to viewfinder part 10 by way of display image converting part 26 for displaying the object image, and also are transmitted to video memory 27. Image data in video memory 27 are updated continuously by FIFO (first-in, first-out method).

In viewfinder part 10, as shown especially in FIG. 1, LCD 13 is placed inside viewfinder housing 12 such that the display image can be viewed through display opening 11, and photosensitive material 21 (such as instant film) is supported on the back of said LCD 13 by a support means (not shown) that has an appropriate film feeding mechanism. In addition, fiber array 18 (guiding means) that conducts light from LCD 13 toward photosensitive material 21, and shutter 20 (film-side shutter) that covers photosensitive material 21 and during exposure allows light to pass from LCD 13 to photosensitive material 21 for a set exposure time, are installed between LCD 13 and photosensitive material 21. Except during exposure, shutter 20 is closed (during normal display).

As LCD 13, for example, a TFT color liquid crystal display can be used. Part numbers 14 and 15 in the figures are a light conducting tube and cold cathode tube that comprise the backlight unit of said display. Moreover, color filters and working electrodes are not shown in the figures.

Optical fiber array 18 has many optical fibers adhered in a two-dimensional flat array, and is formed in a plate shape. Because said guiding means (18) is only required to conduct light from LCD 13 to photosensitive material 21, other means can be used such as a lens array that has many Selfoc lenses (trade name) adhered in an array, or a plate microlens that has a two-dimensional diffractive index distribution region formed within a glass substrate. Moreover, when such a lens array is used, needless to say, LCD 13, said lens, and film 21 are placed at appropriate distance spacing corresponding to the focal distance of said lens such that an exact image is formed on the exposure surface of film 21.

In addition, strobe light 17 as an exposure light source for photosensitive material 21, and light conducting plate 16 that conducts said strobe light to LCD 13, are placed on the display side of LCD 13. Furthermore, shutter 19 (display-side shutter) that blocks infiltration of external light from display opening 11 during film exposure is installed on the front of light conducting plate 16. The display screen is irradiated more brightly by using such exposure light 17 during exposure onto film 21, and noise light from display opening 11 is blocked to obtain a satisfactory print image in a shorter time. Moreover, it does not matter if said exposure light conducting plate 16 uses the same plate as the above-mentioned light conducting plate 14 used as a backlight unit. A light source such as a white light emitting diode, fluorescent lamp, or halogen lamp also can be used for the exposure light source (17).

Furthermore, the camera of this working example has parts that include video/still image changeover switch 29, release operation button 30, print switch 32, and still image memory 28 as shown in FIG. 2. These are explained together with the following explanation of operation.

To explain the operation of this electronic camera, this is as follows:

Image data from photographing part 25 are transmitted to video memory 27 and also transmitted to viewfinder part 10 by way of display image switching part 26, and object images are displayed as video on LCD 13. When the photographer depresses release button 30 at a desired timing, a release operation detection signal is outputted from release operation detector 31 to video memory 27. Based on said detection signal, the image data stored in video memory 27 during said release operation are transmitted to still image memory 28 and recorded.

When video/still image changeover switch 29 is switched to the still image side, display image switching part 26 blocks transmission of image data from photographing part 25, reads the image data in still image memory 28, and transmits these to LCD 13. As a result, the still image with which said release operation is concerned is displayed on LCD 13.

Figure 3:
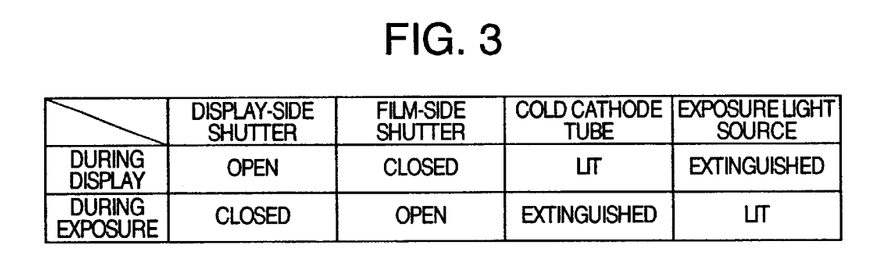
FIG. 3 is a table that illustrates the operation of the electronic camera of FIG. 1.

To print this image, print switch 32 is depressed. Upon detecting that print switch 32 has been depressed, print operation detector 33 outputs drive signals to drive circuits (not shown) for each of cold cathode tube 15, display-side shutter 19, film-side shutter 20, and exposure light 17. As a result, the image on LCD 13 is exposed onto film 21 by extinguishing cold cathode tube 15, closing display-side shutter 19, driving film-side shutter 20, and lighting exposure light 17. Moreover, FIG. 3 shows the operating status of each of parts 15, 17, 19, and 20 during image display in display opening 11 and during exposure onto film 21.

Because exposure time onto film 21 differs depending on the type and sensitivity of the film and the output (brightness) of exposure light 17, the lit time of exposure light 17 or open time of shutter 20 is set to the optimum time corresponding to these. Concretely, when a flash light source (such as a strobe light or flash light) is used as the exposure light, for example, film-side shutter 20 is opened, then exposure light 17 is lit. On the other hand, when a light source such as a white light emitting diode, fluorescent lamp, or halogen lamp is used as exposure light 17, exposure light 17 is lit first, then shutter 20 is opened for a set time.

In this working example, exposure onto film 21 is performed by operating print switch 32, but this also can be constructed such that exposure onto film 21 is performed automatically by depressing release button 30. In this case, each of parts 15, 17, 19, and 20 related to exposure may be operated based on the detection signal from release operation detector 31, and print switch 32 and print operation detector 33 are not required.

Furthermore, in this working example, cold cathode tube 15 is extinguished during exposure, but there is no objection to leaving the cold cathode tube lit during exposure if a light shielding plate that can block the cold cathode tube is installed and light from the cold cathode tube is blocked by this light shielding plate during exposure. In addition, still image memory 28 can be made able to store several images. In this case, a separate changeover switch that switches the still image display on the LCD may be installed, and display image switching part 26 constructed such that image data are read successively from still image memory 28 and displayed on LCD 13 by operating said switch.

Figure 4:
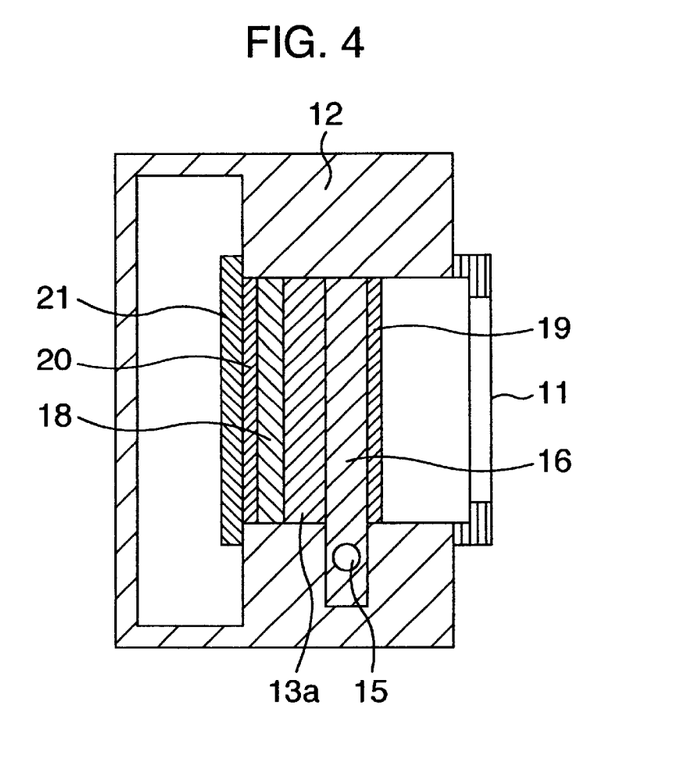
FIG. 4 is a schematic diagram of another structural example of the viewfinder part of an electronic camera with which this invention is concerned.

Furthermore, FIG. 4 shows another structural example of the viewfinder part of the electronic camera of this invention. A permeating type LCD was used in the working example described above, but reflective type LCD 13a also can be used as the liquid crystal display means. Photosensitive material is supported on the back of said reflective type LCD 13a, and film-side shutter 20 and optical fiber array 18 that shield said photosensitive material are installed in the same way as in the working example described above.

Light is supplied to LCD 13a from the back of LCD 13a by installing a lighting unit comprised of cold cathode tube 17 and light conducting plate 16 on the back of said LCD 13a. This lighting unit is used for both applications of displaying images from display opening 11 and exposing onto film 21. In addition, external light infiltrating from display opening 11 is blocked during exposure by placing display-side shutter 19 on the front of light conducting plate 16. Moreover, structures that are the same as the working example described above are labeled in this figure by the same part numbers.

Figure 5:
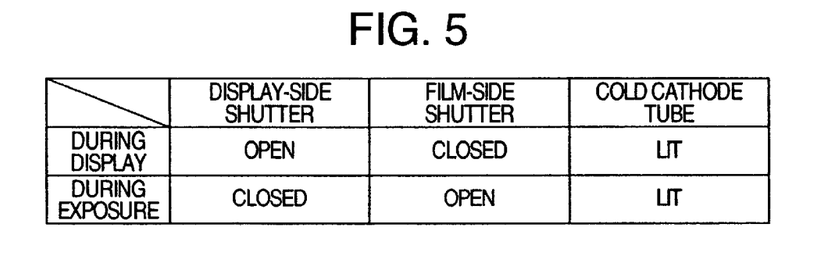
FIG. 5 is a table that illustrates the operation of the electronic camera of FIG. 4.

This LCD 13a can display video or still images in the same way as the working example described above. However, exposing a displayed still image onto film 21 by the detection signal from the above-mentioned print operation detector 33 is performed as follows:

As shown in FIG. 5, during standard image display on LCD 13a, display-side shutter 19 is open, film-side shutter 20 is closed, and cold cathode tube 15 is lit. As a result, the user can view the image displayed on LCD 13a through display opening 11. In addition, when print switch 32 is depressed, display-side shutter 19 is closed, then film-side shutter 20 is opened for a set exposure time (with cold cathode tube 15 still lit). As a result, exposure on film 21 is performed.

Moreover, in said viewfinder structure, preferably, a reflecting surface (specular surface) that reflects light toward the LCD is formed on the surface (LCD side) of film-side shutter 19. This is to make the screen brighter and the image easier to see during LCD display through display opening 11. In addition, the same type of reflecting surface (specular surface) also may be formed on the inside surface of display-side shutter 19. According to such as structure, the light of cold cathode tube 15 is reflected toward the LCD during exposure, and exposure efficiency can be improved still more.

According to this type of electronic camera, because a liquid crystal display can be used as an exposure means onto photosensitive film at the same time as it is used as a display means to confirm the image, this enables print output of images without enlarging the overall apparatus; that is, without damaging portability. In addition, a viewfinder structure that includes the above-mentioned exposure means can be applied to data terminal apparatuses that include electronic notebooks and various types of camera devices that have an LCD.

Figure 6:
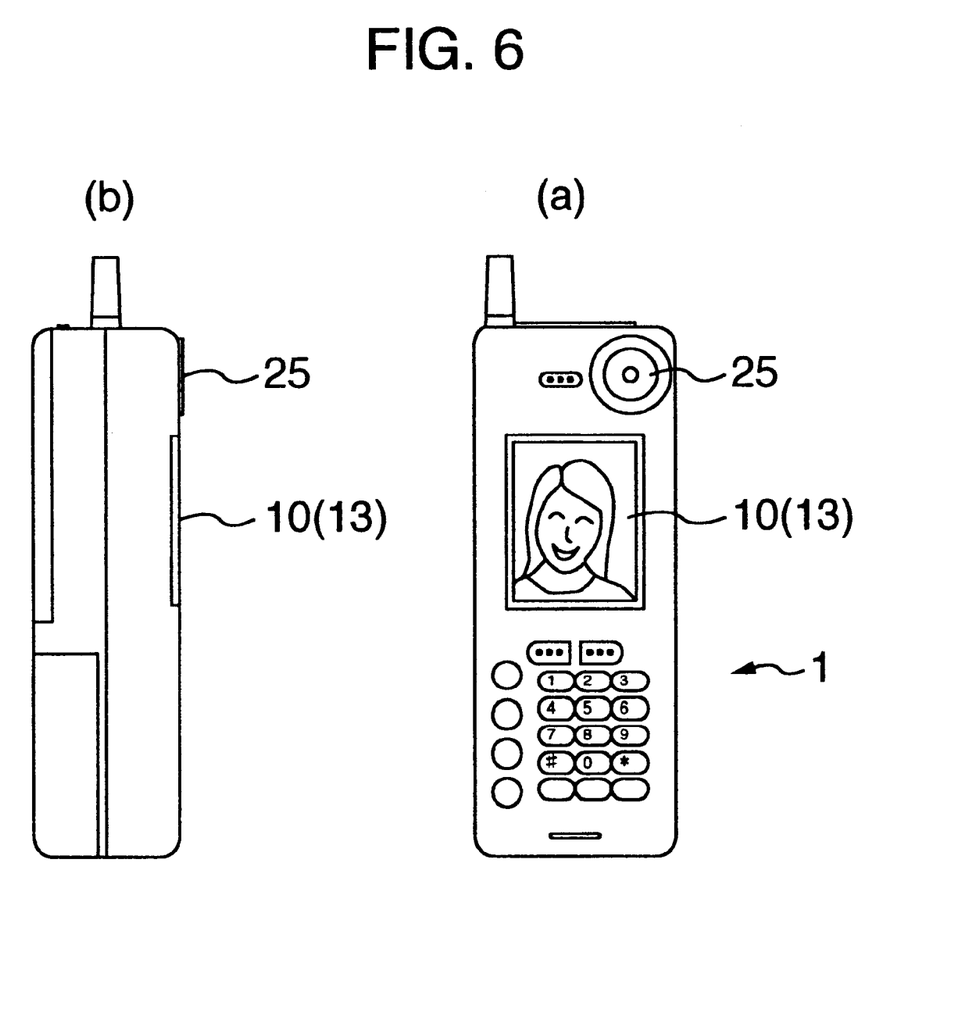
FIG. 6 is a front elevation (a) and side elevation (b) that show the external structure of a portable telephone with which one working example of this invention is concerned.
Figure 7:
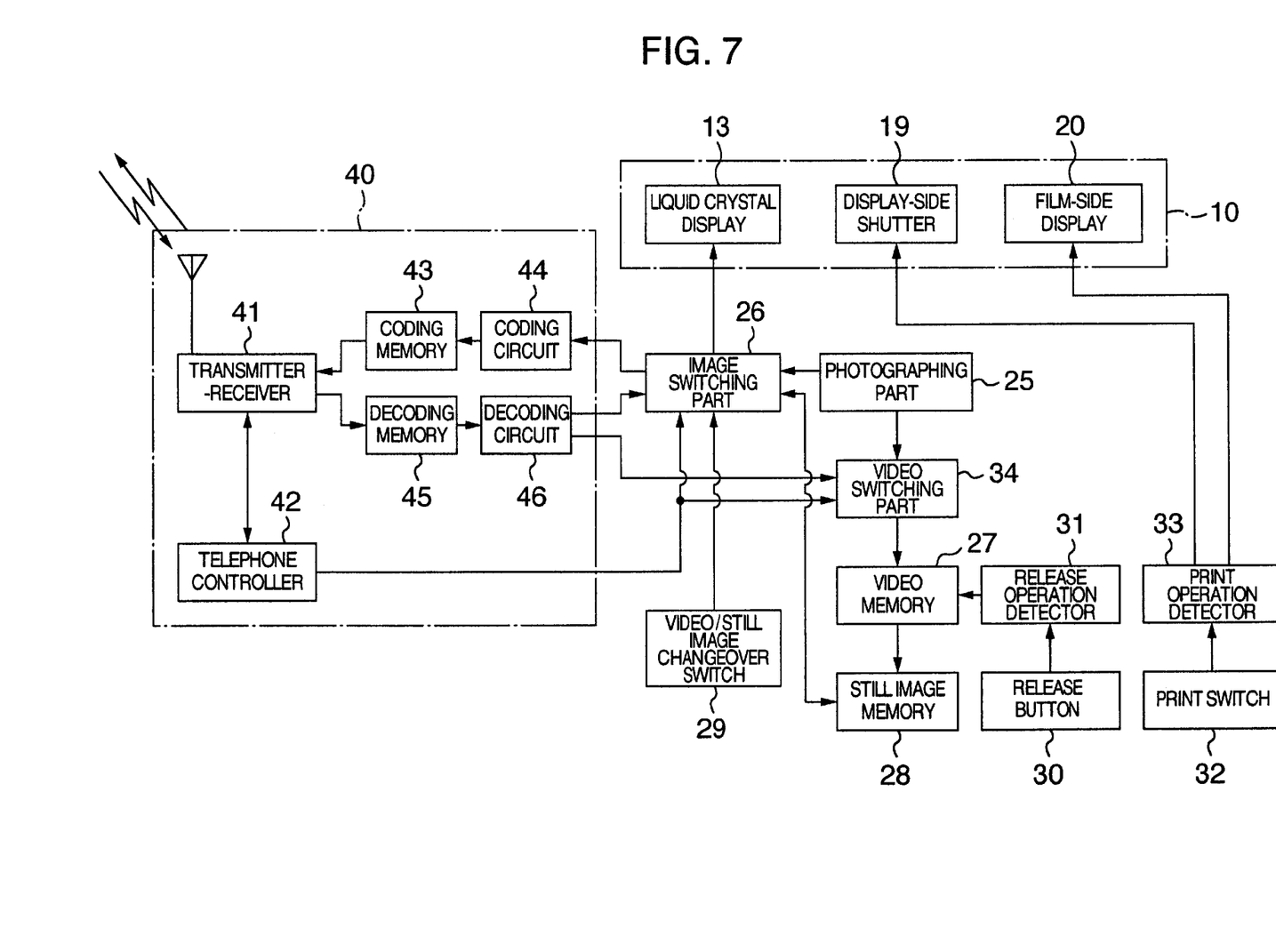
FIG. 7 is a block diagram that shows the schematic structure of the portable telephone shown in FIG. 6 described above.

FIGS. 6 and 7 show an example of a portable telephone with which this invention is concerned. As shown in the figures, this portable telephone handset 1 has portable telephone part 40 for transmitting and receiving audio signals and image signals (including images such as text and graphics), liquid crystal display part 10 that can display images such as text or graphics by containing liquid crystal display 13 (reflective-type LCD), and photographing part 25 that can photograph a desired object.

Like standard portable telephones, portable telephone part 40 includes parts such as a modulation circuit, transmitting circuit, receiving circuit, demodulating circuit, and carrier wave synthesizer (all not shown) inside transmitter-receiver 41, transmits to a telephone line by multiplexing a carrier wave onto audio inputted from a microphone (not shown) and the image signal obtained by photographing part 25, outputs audio from a speaker (not shown) by removing the carrier wave from the signal from a telephone line and demodulating, and displays the image on LCD 13.

Photographing part 25 includes an optical lens, CCD, and image processing circuit (not shown in the figure) for forming an object image and converting this to an electrical signal. Image data from said photographing part 25 are transmitted to LCD 13 by way of image switching part 26 to display as video, and are transmitted to video memory 27 by way of video switching part 34. Image data in this video memory 27 are updated continuously by FIFO. In addition, video switching part 34 switches the image stored in video memory 27 between the image from said photographing part 25 and the image received from a telephone line based on a control signal from telephone controller 42 as described below.

In addition, liquid crystal display part 10 has the same structure as the liquid crystal display part of the above-mentioned electronic camera shown in FIG. 4. As a result, the image displayed on the LCD can be copied onto photosensitive film. To avoid duplicating explanation, this is not explained again here.

Furthermore, as shown in FIG. 7, the telephone of this working example has parts that include video/still image changeover switch 29 that switches the display image on LCD 13, release operation button 30 that for determining the image to print onto film, print switch 32 for printing onto film, and still image memory 28 that stores the image to be printed.

To explain the operation of this portable telephone, this is as follows:

Image data from photographing part 25 are transmitted to video memory 27 by way of video switching part 34 and also transmitted to liquid crystal display part 10 by way of display image switching part 26, and object images are displayed as video on LCD 13. When the photographer depresses release button 30 at a desired timing, a release operation detection signal is outputted from release operation detector 31 to video memory 27. Based on said detection signal, the image data stored in video memory 27 during said release operation are transmitted to still image memory 28 and recorded.

When video/still image changeover switch 29 is switched to the still image side, display image switching part 26 blocks transmission of image data from photographing part 25 to LCD 13, reads the image data in still image memory 28, and transmits these to LCD 13. As a result, the still image with which said release operation is concerned is displayed on LCD 13.

To print this image, print switch 32 is depressed. Upon detecting that print switch 32 has been depressed, print operation detector 33 outputs drive signals to drive circuits (not shown) for each of display-side shutter 19 and film-side shutter 20. As a result, by closing display-side shutter 19 and driving film-side shutter 20, and the image on LCD 13 is exposed onto film 21.

Moreover, FIG. 5 shows the operating status of each of parts 15, 19, and 20 during image display in display opening 11 and during exposure onto film 21. Because exposure time onto film 21 differs depending on the type and sensitivity of the film and the output (brightness) of cold cathode tube 15, the open time of shutter 20 for exposure is set to the optimum time corresponding to these.

In this working example, exposure onto film 21 is performed by operating print switch 32, but as in the working example described above, this also can be constructed such that exposure onto film 21 is performed automatically by depressing release button 30. That is, both display-side and film-side shutters 19 and 20 can be operated successively at a set timing based on the detection signal from release operation detector 31. In this case, print switch 32 and print operation detector 33 are not required. In addition, as in the working example described above, still image memory 28 may be constructed such that it can store several images.

The portable telephone with which this working example is concerned also can print and output images received from a telephone line. That is, image data received from a telephone line by way of transmitter-receiver 41 are stored temporarily in decoding memory 45, then expanded by decoding circuit 46 and transmitted to liquid crystal display part 10 by way of image switching part 26. Once image switching part 26 has assured the telephone line, the image signal from photographing part 25 is blocked based on a control signal from telephone controller 42, and the image signal from decoding circuit 46 is transmitted to LCD 13. As a result, the image received from the telephone line is displayed on LCD 13.

In addition, the image data received from the telephone line are transmitted to video memory 27 by way of video switching part 34. Based on the control signal from telephone controller 42, video switching part 34 transmits the image data from said telephone line to video memory 27 instead of the image data from photographing part 25. When release button 30 is depressed in this status, images are sent from video memory 27 to still image memory 28, and by further operating print switch 32, can be exposed onto film 21.

Moreover, once the telephone line is assured, image data from photographing part 25 are transmitted to portable telephone part 40 by way of image switching part 26. After coding and compressing by coding circuit 44, these are stored temporarily in coding memory 43, then transmitted to the telephone line through transmitter-receiver 41.

Thus, according to portable telephone handset 1 with which this working example is concerned, using LCD 13 for both applications of display and exposure enables print output of display data while avoiding enlarging the apparatus and without damaging portability. The user can obtain a photograph on the spot by printing a movie photographed by photographing part 25 or an image received through the portable telephone line.

Figure 8:
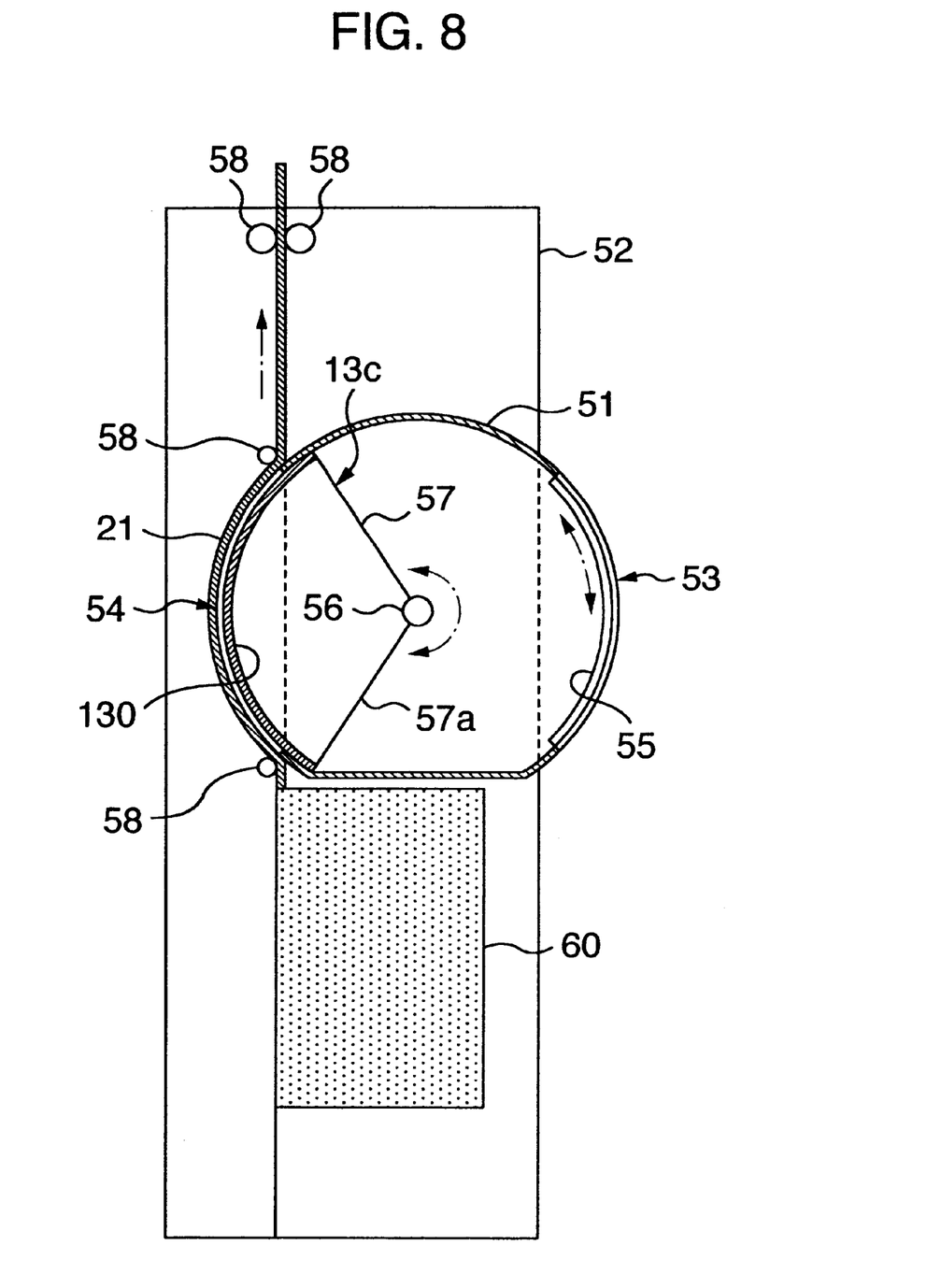
FIG. 8 is a perpendicular section that shows another schematic structural example of the liquid crystal display part of an apparatus with which this invention is concerned.

Furthermore, FIG. 8 shows another structural example of the liquid crystal display part of an apparatus with which this invention is concerned. As shown in the figure, in this working example, LCD 13c that has a roughly fan-shaped cross-section (such as film liquid crystal or plastic liquid crystal) is placed inside cylindrical basket 51 that extends roughly horizontal (perpendicular to the page) inside apparatus housing 52. LCD 13c has display panel part 130 that has a circular arc cross-section and extends along the inner circumference of basket 51, pivot 56 that extends through the center of basket 51 in the longitudinal direction of said basket, and two support plates 57 and 57a that support both the upper and lower edges of panel part 130 on pivot 56 and can rotate inside basket 51 centered on pivot 56.

Basket 51 has display window 53 on its front, and has window 54 for exposing onto photosensitive material 21 on its back. The size and the shape of the opening of both of these windows 53 and 54 roughly match the size and shape of LCD display panel part 130. Moreover, in this working example, exposure window 54 is formed exactly behind (opposite) display window 53, but this also can be formed on the top or bottom of the basket (in which case, film 21 described below is fed to the position of said exposure window).

In this working example, photosensitive film 21 is stored inside film cartridge 60 installed below basket 51, and is withdrawn from this cartridge 60 and placed by an appropriate guide means (such as guide rollers 58) behind exposure window 54 such that it lies along LCD display panel part 130. Panel part 130 has a light source (backlight; not shown) on its rear surface (between support plates 57 and 57a).

In addition, shield plate 55 (display window shielding means) that closes display window 53 and blocks infiltration of external light from said display window is installed inside said display window 53. This shield plate 55 curves in the same circular arc as LCD display panel part 130, and can slide along the inner circumference of basket 51.

FIG. 8 shows the status during exposure: the display surface (panel part 130) of LCD 13c faces exposure window 54, and display window 53 is closed by shield plate 55. By lighting the backlight and displaying LCD 13c (130) in this status, the display image can be exposed onto film 21. Moreover, because in this working example, unlike the working example described above, film is placed and exposed on the front (display surface) of LCD, the LCD display is inverted during exposure. As a result, the image can be exposed onto the film just as it appears on the LCD.

During normal display, LCD 13c is rotated roughly 180° from the status shown in FIG. 8, display panel part 130 faces display window 53, and the user can view LCD screen 130 through display window 53. Moreover, display window 53 is opened in this status by rotating shield plate 55 in the same direction as LCD 13c (clockwise in the figure).

LCD 13c may be rotated by manual operation, or can be driven to rotate by a power means such as a motor. In addition, shield plate 55 preferably is constructed such that it rotates as LCD 13c rotates. Concretely, for example, this is designed such that LCD 13c strikes shield plate 55 as it rotates, and further rotation of LCD 13c presses shield plate 55 forward until shield plate 55 in the position of display panel 53 is replaced by LCD 13c (display panel part 130).

According to this type of structure, an LCD can be switched between display and exposure statuses such that film 21 is not exposed by light infiltrating from outside even without installing a special shutter on exposure window 54 (needless to say, a shutter also may be installed). Moreover, in this case, to assure perfect exposure onto film 21, both the left and right edges of basket 51 are sealed such that light cannot infiltrate. Support plates 57 and 57a have shielding properties, and preferably are used by having these extend as far as the two sealed edges of said basket 51.

Furthermore, it is possible to install a pressing means (such as a spring) which presses shield plate 55 (display window shielding means) toward closing, and in that case, when LCD 13c is rotated to the exposure position (the status shown in FIG. 8), shield plate 55 is rotated by the pressing force of said pressing means and closes display window 53). Moreover, the structural example shown in FIG. 8 can be applied to the liquid crystal display part of all apparatuses (exposure apparatus, electronic camera, data terminal, and portable communication apparatus) that are the object of this invention.

The present invention is not limited to the foregoing working examples but many modification and variations are possible within the spirit and scope of the appended claims of the invention. For example, the method of exposure onto photosensitive material, besides exposing by one exposure operation per one photosensitive material, can be, for example, a method that exposes successively (three times) by color filters installed in the liquid crystal display for each color (R (red), G (green), and B (blue), or Y (yellow), M (magenta), and C (cyan).

In addition, in the display part structure shown by FIG. 1 or FIG. 4 described above, when a reflecting surface (specular surface) that reflects light toward LCD 13 is formed on the surface (front) of film-side shutter 20, this can improve LCD visibility by making the screen brighter during image display through display opening 11. In addition, when the same type of reflecting surface (specular surface) is formed on the back of display-side shutter 19, by reflecting the light of cold cathode tube 15 toward photosensitive material 21 during exposure, this can improve the efficiency of said lighting light and use exposure light more efficiently. In addition, for example, so-called seal printing can be executed by applying an adhesive ahead of time to the back surface of stored instant film.

What is claimed is:

1. Exposure apparatus so characterized that it is an exposure apparatus that can copy display data on a liquid crystal display means onto photosensitive material, said exposure apparatus comprising:
   a photosensitive material holding means that holds photosensitive material on the back of said liquid crystal display means,
   a first shutter means that can let through and block light from said liquid crystal display means to the photosensitive material, and
   a second shutter means that blocks infiltration of external light by covering a display surface of said liquid crystal display means during exposure of the photosensitive material.

2. The apparatus of claim 1 wherein said exposure apparatus is a camera that has a photographing means that converts an object image formed by a photographic lens to image data and said liquid crystal display means that can display the object image based on the image data, and can copy the object image onto the photosensitive material.

3. The apparatus of claim 1 wherein said exposure apparatus is a data terminal that can copy display data on said liquid crystal display means onto the photosensitive material.

4. The apparatus of claim 1 wherein said exposure apparatus is a portable communication apparatus which includes said liquid crystal display means and a communication means that can receive at least data that can be displayed on said liquid crystal display means.

5. The apparatus of claim 4 wherein said portable communication apparatus further comprises a photographing means that can convert an object image formed by a photographic lens to image data, said communication apparatus can transmit the image data, and said liquid crystal display means can display an image.

6. Exposure apparatus so characterized that it is an exposure apparatus that can copy display data on a liquid crystal display means onto photosensitive material, said exposure apparatus comprising:
   a display window in which said liquid crystal display means can be placed,
   a photosensitive material holding means that holds photosensitive material within a housing of said apparatus, and
   a display window shielding means that can block infiltration of external light by shielding said display window, and
   said liquid crystal display means is supported within said housing such that said liquid crystal display means rotates freely between a display position in which a display surface of said liquid crystal display means faces said display window and an exposure position in which said display surface faces the photosensitive material.

7. The exposure apparatus of claim 6 wherein said exposure apparatus is a camera that has a photographing means that converts an object image formed by a photographic lens to image data and said liquid crystal display means that can display the object image based on the image data, and can copy the object image onto the photosensitive material.

8. The apparatus of claim 6 wherein said exposure apparatus is a data terminal that can copy display data on said liquid crystal display means onto the photosensitive material.

9. The apparatus of claim 6 wherein said exposure apparatus is a portable communication apparatus having said liquid crystal display means and a communication means that can receive at least data that can be displayed on said liquid crystal display means.

10. The apparatus of claim 6 wherein said display window shielding means opens said display window as said liquid crystal display means is rotated to said display position, and closes said display window as said liquid crystal display means is rotated to said exposure position.

11. The apparatus of claim 6 further comprising a guiding means that conducts display light of said liquid crystal display means to the photosensitive material.

12. The apparatus of claim 6 further comprising a light source for supplying light for exposure to said liquid crystal display means, and the photosensitive material is exposed by the light supplied from said light source.

* * * * *